April 24, 1951 C. E. CLEETON 2,549,776

PULSE DISCRIMINATING APPARATUS

Filed March 10, 1945 2 Sheets-Sheet 1

Inventor
CLAUD. E. CLEETON

By Ralph L. Chappell
Attorney

April 24, 1951 C. E. CLEETON 2,549,776

PULSE DISCRIMINATING APPARATUS

Filed March 10, 1945 2 Sheets-Sheet 2

Inventor

CLAUD E. CLEETON

By Ralph L. Chappell

Attorney

Patented Apr. 24, 1951 2,549,776

UNITED STATES PATENT OFFICE 2,549,776

PULSE DISCRIMINATING APPARATUS

Claud E. Cleeton, Washington, D. C.

Application March 10, 1945, Serial No. 582,097

2 Claims. (Cl. 250—27)

(Granted under the act of March 3, 1883, as amended April 30, 1928; 370 O. G. 757)

This application relates to electronic control circuits and particularly to those which are adapted to respond to electrical impulses possessing certain definite pre-determined characteristics.

One object of this invention is to provide a circuit which is discriminatory in its action, in that it is highly responsive to a certain type of electrical impulse and unresponsive to electrical impulses not of the same type.

Another object of this invention is to provide a circuit which is discriminatory in its action, in that it is highly responsive to a succession of electrical impulses which have certain definite predetermined characteristics and un-responsive to successions of electrical impulses not of the same character.

Still another object of this invention is to provide a circuit which, although receiving a variety of electrical impulses from a single source or plurality of sources over a channel or channels in common with other circuits, will respond only to those electrical impulses or combination of electrical impulses of a definite predetermined character.

The invention will be more fully understood, and other objects and features will become apparent in connection with the description given below, when taken together with the accompanying drawings, in which.

Broadly this invention provides a discriminator circuit which is held responsive only to an electrical impulse or a succession of electrical impulses possessing certain predetermined time characteristics.

The known applications of a discriminating circuit of the type hereinafter described are many, and more will doubtless occur to those well versed in the art without exceeding the limits of the invention disclosed herein. For example, this discriminating circuit may be used in radar or radio beacon equipment to discriminate against pulses transmitted for search or other purposes and to favor pulses the sole purpose of which is to excite the beacon transmitter. Again, this discriminating circuit may be used in television equipment to distinguish between the pulses intended to synchronize the vertical sweep and further, to distinguish between both of these pulses and random noise which, if of a sufficient amplitude, might cause out of synchronous deflection. Again, this discriminating circuit may be used in communication signaling apparatus to make it possible to govern the signal or signals to which the receiver is responsive or to provide a measure of security in such signaling by means of selective response of related circuits to a pulse transmission posessing the required characteristics. Again, this discriminating circuit may be used in connection with a related circuit to provide a pulse filter or relay in such a fashion as to delay or reject an electrical impulse signal according to the characteristics of the signal.

For purposes of illustration only the last mentioned embodiment is described in detail, it being understood that the invention is not to be limited to this single embodiment.

The operation of the discriminating circuit herein described is based upon two known principles, one of which involves the effect upon an oscillatory circuit of an attempted abrupt change of the voltage across it or the current through it and the other involves the use of an amplitude selector circuit.

Figure 1:
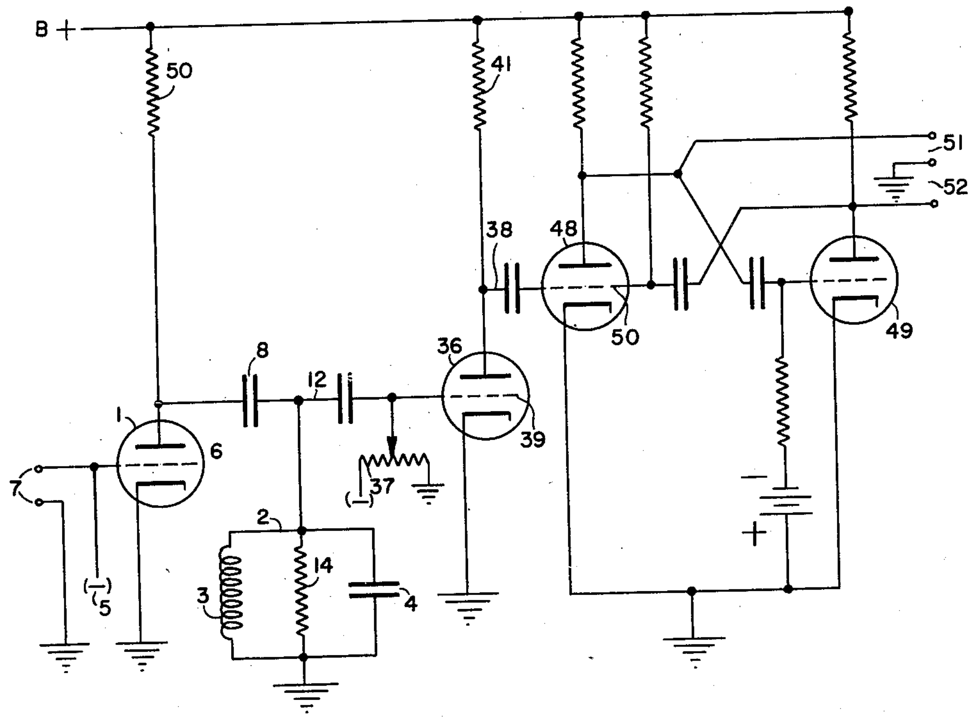
Figure 1 is a circuit diagram of one embodiment of the invention.

Reference is now had in particular to Figure 1, wherein there is shown one embodiment of the invention, comprising an input stage, or switching tube 1, an oscillatory circuit 2, and an amplitude selector tube 36. The oscillatory circuit 2 consists of a parallel connected inductance 3 and capacitance 4, either of which may be made variable to tune the circuit to a desired frequency. In practice, the switching tube 1 is generally preceded by a limiter section, not shown, but designed to apply to input 7 a voltage signal of uniform amplitude, for reasons soon to become apparent. In operation, tube 1 is normally biased below cut-off by means of the negative voltage 5 applied to its grid 6, while the plate is connected to a source of B+ through resistance 50. Upon the application of an abrupt positive change of potential, such as the leading edge of a substantially rectangular positive pulse to input 7, grid 6 is driven suddenly above cut-off potential and tube 1 drives to saturation thereby causing an abrupt drop in its plate potential. This abrupt drop in plate potential is communicated to oscillatory circuit 2 through capacitor 8 and shock excites oscillatory circuit 2 into oscillation. This action takes the form of a damped sine wave voltage, occurring at the resonant frequency of the circuit and damped according to circuit losses. The latter is represented by resistance 14 which may be made variable for purposes of regulating the rate of decay. At the end of the afore-mentioned rectangular pulse, tube 1 is returned to cut-off so that its plate potential abruptly rises to shock excite a second train of oscillations in the oscillatory circuit 2. This second train of oscillations starts in phase opposite to the first and may reinforce or oppose the amplitude of the existing oscillations depending upon the time duration of the input pulse, as will be explained by reference to the waveforms shown in Figure 3.

Figure 3:
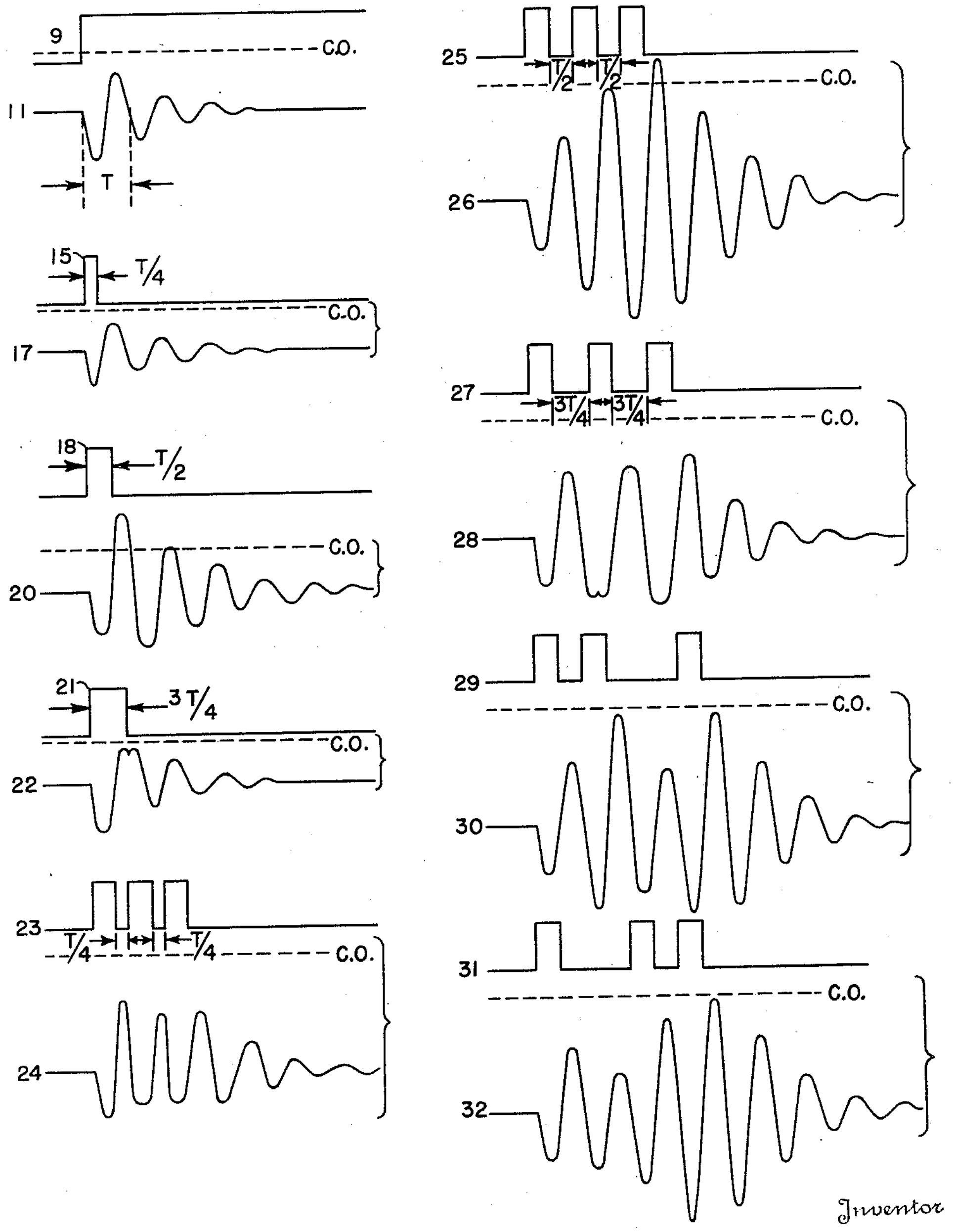
Figure 3 shows a series of wave forms taken to illustrate the operation of the circuit shown in Figures 1 and 2.

In Figure 3, pulse 9 is a representative pulse applied to input 7 and is shown as being of a time duration much greater than the natural period T of the oscillatory circuit 2. Its effect upon the oscillatory circuit 2 is illustrated by the waveform 11 which appears at output 12 of this section. As shown the leading edge pulse 9 raises the bias potential of tube 1 sharply above cutoff (indicated by dotted line C. O.) to thereby shock circuit 2 into oscillations. The first excursion of this oscillatory voltage will always be in a negative direction starting at zero phase since the positive leading edge of the input pulse causes a drop in the plate potential of tube 1. The oscillations which follow continue until damped out by circuit losses inasmuch as pulse 9 has a time duration which is long compared to period T.

In Figure 3, pulse 15 is another representative pulse applied to input 7 and is shown as being of a time duration less than one quarter the natural period T of the oscillatory circuit 2. In the same manner as before the leading edge of the input pulse 15 shock excites the oscillatory circuit 2 into oscillation somewhat as shown at 17. In this case, however, the trailing edge of pulse 15 is impressed upon input 7 prior to the time the initial oscillation has reached a point of maximum rate of change of voltage. The effect of this trailing edge will be to set up a second train of oscillations which will be in opposition to the original oscillations and the result will be the low amplitude waveform 17.

Pulse 18 is another representative pulse applied to input 7 and is shown as being of time duration of approximately one-half the natural period T of the oscillatory circuit 2. In this case the trailing edge of pulse 18 arrives at a point after oscillations have been started and where the rate of change of voltage is maximum so that the train of oscillations which it excites re-inforces the original oscillations thus resulting in the high amplitude waveform 20.

Pulse 21 is another representative pulse applied to input 7 and is shown as being of time duration somewhat greater than three-quarters the natural period T of the oscillatory circuit 2. In this instance, the trailing edge arrives at such a time in the oscillatory cycle that its resulting oscillatory wave train again is in opposition to the oscillations caused by the leading edge and the result will be the low amplitude waveform 22.

From the output waveforms 17, 20, and 22 it will be apparent that the amplitude of oscillation depends upon the time duration of the rectangular pulse in terms of the natural period of the L-C oscillatory circuit 2. It will further be apparent that, in the case of a single pulse, the amplitude of oscillation will be a maximum when a pulse having a time duration equal to approximately one-half the natural period of the oscillatory voltage is impressed on input 7.

The fact immediately suggests itself that the trailing edge of a pulse having a time duration equal to approximately one and one-half times the natural period would arrive at such a time as to cause optimum reinforcement; but in this case the first oscillatory wave train will have been damped to such a low amplitude during such a pulse that even the reinforced oscillations will not reach the amplitude caused by the one-half period pulse.

It naturally follows that the amplitude of oscillation might be increased further by the application of a succession of pulses having the proper time duration and sequence. If this is to be true, it is evident from waveforms 17, 20, and 22 that the time duration of each of the pulses and the time spacing of said pulses in such a succession must both bear a definite relation to the natural period of the oscillatory circuit 2, to secure a smooth and continuous build up of oscillations.

In Figure 3, waveform 23 is representative of a succession of impulses applied to input 7, each individual pulse of which is of the proper time duration as hereinbefore described, but the spacing in time between each such pulse is equal to approximately one-quarter of the period of oscillations of circuit 2. It is apparent from waveform 24, which is the result of this succession of pulses, that the oscillations excited by each pulse after the first are such as to oppose rather than re-inforce the already existing oscillations.

In Figure 3, waveform 25 is representative of a succession of pulses so spaced in time, as illustrated by waveform 26, that the oscillations excited by the leading and trailing edges of each pulse after the first are such as to cause a maximum reinforcement of the oscillations existing at the end of the previous pulse.

In Figure 3, waveform 27 differs from waveforms 23 and 25 only in the time spacing between pulses which is now equal to approximately three-quarters of the natural oscillatory period. Waveform 28 illustrates the fact that this spacing again results in an opposition of oscillations.

Other pulse arrangements may be applied to input 7 such as waveform 29 in Figure 3 resulting in the oscillation shown by waveform 30 or waveform 31 resulting in waveform 32 but it will be apparent from these that the damping of the oscillations between pulses which are spaced greater than approximately one-half period results in an oscillatory voltage the maximum amplitude of which is less than that achieved by the pulse arrangement shown at 25.

Figure 2:
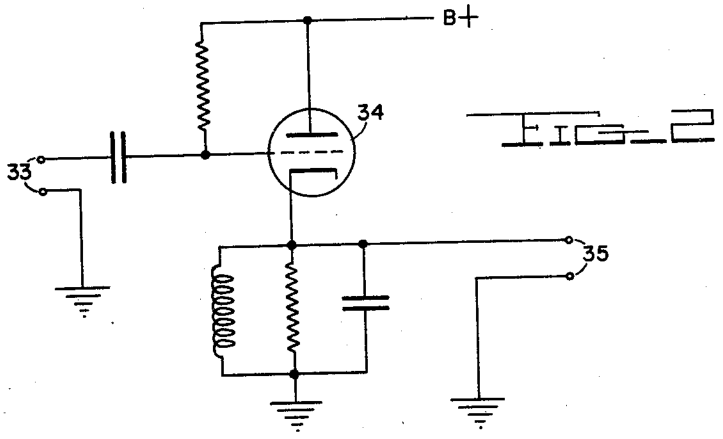
Figure 2 is a circuit diagram illustrating a method alternate to that shown in Figure 1 of employing one of the principles upon which this invention is based.

In Figure 2 is shown an alternate method of shock exciting an oscillatory circuit which might be employed in lieu of the arrangement previously described. This alternative arrangement will respond to a negative rather than a positive input pulse but the overall results are essentially the same and its, or similar arrangements may be used in the discriminating circuit whenever its characteristics are advantageous without exceeding the limits of this invention. In Figure 2, a negative pulse applied to input 33 cuts off tube 34 which is ordinarily conducting strongly and the abrupt change in plate current flow shocks the oscillatory circuit in the cathode lead into oscillation. The trailing edge of such a pulse also results in shock excited oscillations which may or may not re-inforce the original oscillations at output 35.

In Figure 1, tube 36 and its associated components comprise one of several well known types of amplitude selector circuits. Tube 36 is a tube having sharp cutoff characteristics and is normally biased below cut-off by potentiometer 37 so that tube 36 will only amplify that part of the oscillation that exceeds the cutoff bias set by potentiometer 37, which may be adjusted according to whether a one, two, three, etc. pulse system is to be used. For example in a single pulse system, potentiometer 37 should be adjusted so that the cutoff for tube 36 is somewhat as shown by the dotted line labeled C. O. in waveform 20. While in a three pulse system, potentiometer 37 should be adjusted so that the cutoff bias C. O. lies somewhat as shown in waveform 26. In either case, an output pulse will only occur at point 38 when the characteristics of the input pulses are those hereinbefore set forth.

In Figure 1, tubes 48 and 49 and their associated components represent a conventional gate or pulse forming multi-vibrator. This circuit is so designed that a negative signal applied to grid 50 cuts off tube 48 and results in the formation of a positive pulse at output 51 or a negative pulse at output 52 as required.

Viewing the operation of the circuit shown in Figure 1 as a whole, a variety of electrical impulses may be impressed at intput 7. As hereinbefore explained, however, only a pulse of a predetermined time duration or a plurality of such pulses properly spaced in time will cause a positive oscillation of maximum amplitude to appear at grid 39 of tube 36. The bias voltage 37 of tube 36 is of such a value as to keep tube 36 cutoff for any value of signal less than such positive oscillation of maximum amplitude.

When the proper pulse or proper succession of pulses is applied to input 7, tube 36 conducts and a negative signal is applied to grid 50. This signal triggers the multi-vibrator and a pulse, either positive or negative, is obtained at the output. This impulse may have a time duration either equal, less, or greater than the original pulses applied to input 7 depending upon the choice of constants in the multivibrator and its leading edge will be delayed in time with respect to the leading edge of the single pulse or initial pulse in a succession of pulses slightly more than an integral number of one-half periods of oscillatory circuit 2.

In this manner, the discriminating circuit has been used, in combination with a multivibrator, to provide an apparatus which will act as a selective filter and which will pass only electrical impulses or successions of electrical impulses of a definite pre-determined character and to reject all others. In addition, it has been used to provide a time delay in the transmission of a signal which is a function of the natural frequency of the oscillatory circuit.

It can be seen from the foregoing that the negative impulse appearing at the plate of tube 36 may, instead of being applied to the control grid of a multivibrator, be used for the triggering of a wide variety of devices as hereinbefore described. A plurality of such discriminating circuits may be provided in the same device to control the triggering of a plurality of devices, each of such circuits being responsive to an electrical impulse of different time duration or succession of electrical impulses of different time duration or succession of electrical impulses of different time duration and time spacing.

It is not intended that the discriminating circuit be used exclusively with any particular type of electrical impulse producing control. It is only necessary that the original signal be of such a nature as to dictate the time duration and time spacing of the electrical impulses ultimately applied to the discriminating circuit. Any suitable means of translating the original signals into electrical impulses of sufficient amplitude and slope may be employed. It is not necessary that the signals applied to the discriminator be rectangular in shape but only that they have leading and trailing edges of sufficient amplitude and slope to cause the proper excitation of the oscillatory circuit.

Various modifications may be in the invention without department from the spirit thereof and I do not therefore wish to limit myself to what has been shown and described except as such limitations occur in the appended claims.

The invention described herein may be manufactured and used by or for the Government of the United States of America for governmental purposes without the payment of any royalties thereon or therefor.

What is claimed is:

1. In a pulse transmission system, means for obtaining pulse width and space discrimination, comprising a damped oscillatory circuit consisting of a parallel connection of an inductance, a capacitance and a resistance, tuned to a frequency whose period is substantially twice the duration of the incoming pulses to be favored, a normally blocked amplifier coupled to said oscillatory circuit for impressing the incoming pulses thereon to produce damped oscillations therein, a vacuum tube amplifier having a control grid therefor fed by the output of said oscillatory circuit, means biasing said control grid below cut-off by a predetermined amount whereby only those damped oscillations which exceed said bias will produce an output from the vacuum tube amplifier, and a pulse generator fed by the output of said vacuum tube amplifier and operative responsive thereto to produce a single voltage pulse of controllable duration and phase.

2. In a pulse transmission system, means for obtaining pulse width and space discrimination, comprising a lightly damped oscillatory circuit consisting of an inductance, a capacitance and a resistance tuned to a frequency whose period is substantially twice the duration of the incoming pulses to be favored, a normally blocked amplitude limiting amplifier coupled to said oscillatory circuit for impressing the incoming pulses thereon to produce damped oscillations therein, a vacuum tube amplifier having a control grid coupled to said oscillatory circuit, means biasing said control grid beyond cut-off by a predetermined amount whereby only those damped oscillations which exceed said cut-off bias will produce an output from said vacuum tube amplifier, and a multivibrator circuit fed by the output of said vacuum tube amplifier operative responsive thereto to produce a single voltage pulse of controllable duration.

CLAUD E. CLEETON.

REFERENCES CITED

The following references are of record in the file of this patent:

UNITED STATES PATENTS

| Number | Name | Date |
|---|---|---|
| 2,063,025 | Blumlein | Dec. 8, 1936 |
| 2,153,202 | Nichols | Apr. 4, 1939 |
| 2,181,309 | Andrieu | Nov. 28, 1939 |
| 2,405,843 | Moe | Aug. 13, 1946 |